Jan. 5, 1960   B. F. BUTLER   2,919,835
OPENER AND DISPENSER FOR CANNED FLUIDS
Filed April 10, 1956   2 Sheets-Sheet 1
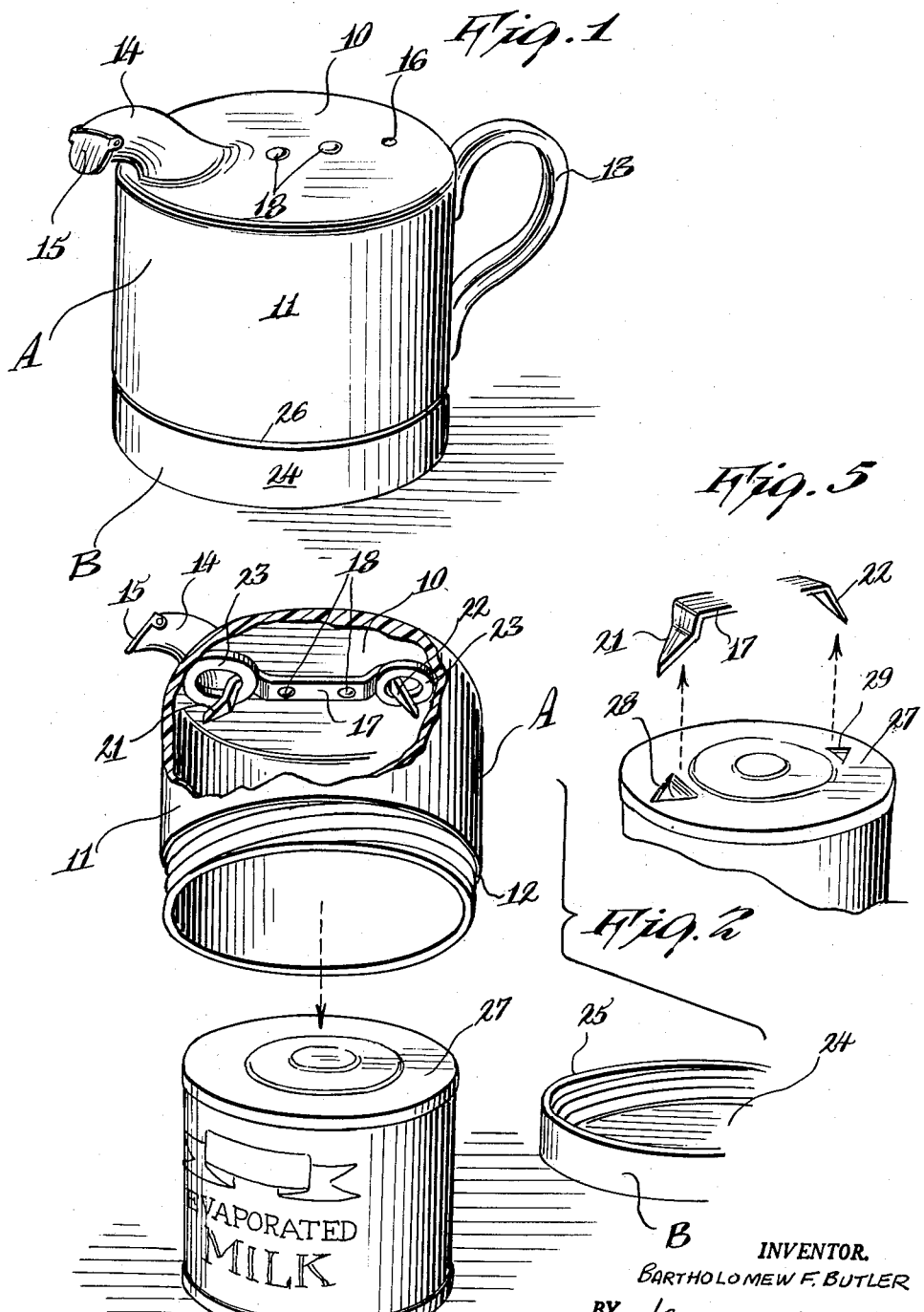
INVENTOR.
BARTHOLOMEW F. BUTLER
BY
ATTORNEY Jan. 5, 1960  B. F. BUTLER  2,919,835
OPENER AND DISPENSER FOR CANNED FLUIDS
Filed April 10, 1956  2 Sheets-Sheet 2
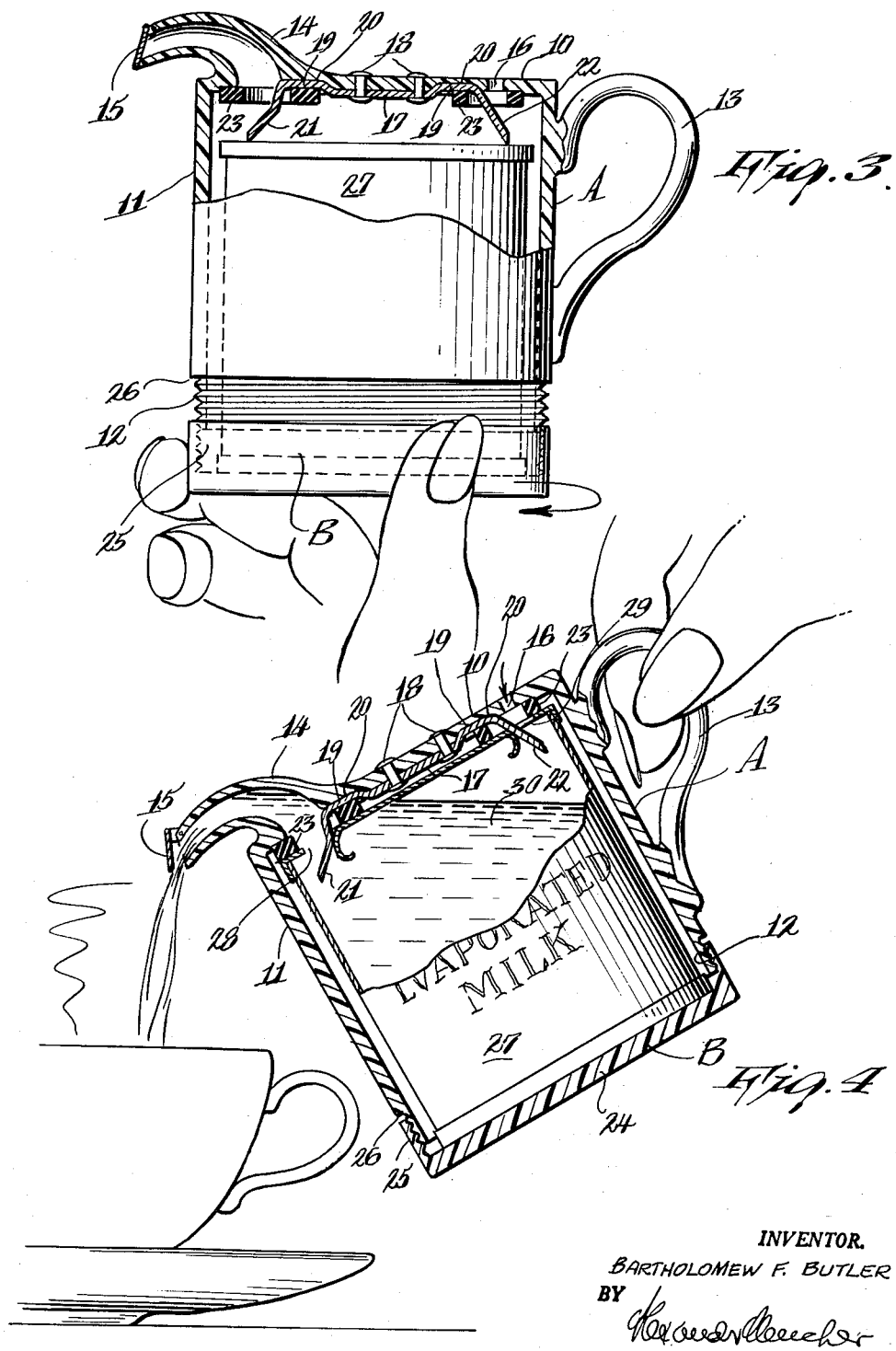
INVENTOR.
BARTHOLOMEW F. BUTLER
BY
ATTORNEY

United States Patent Office 2,919,835
Patented Jan. 5, 1960

2,919,835

OPENER AND DISPENSER FOR CANNED FLUIDS

Bartholomew F. Butler, St. Albans, N.Y.

Application April 10, 1956, Serial No. 577,246

1 Claim. (Cl. 222—86)

This invention relates to dispensers for evaporated milk or the like.

It is an object of the present invention to provide a dispenser for evaporated milk or the like wherein it is unnecessary to remove the evaporated milk from the can, the evaporated milk and can being received as a unit within the dispenser to effect an economy of time and labor.

It is another object of the present invention to provide a dispenser for evaporated milk or the like of the above type which includes a removable screw-on bottom closure which, when screwed onto the bottom of the dispenser, forces the can of evaporated milk against a pair of puncture prongs to automatically open the can as it is properly positioned within the dispenser.

It is still another object of the present invention to provide a dispenser for evaporated milk or the like of the above type which includes a handle whereby the same may be handled in the same manner as a pitcher and also a pouring spout, the pouring spout being in communication with one of the openings in the evaporated milk can provided for by the puncture prongs.

It is still another object of the present invention to provide a dispenser for evaporated milk or the like of the above type wherein gasket means are provided surrounding each of the puncture prongs to completely seal in the can openings except for a relatively small area as an air opening necessary for pouring whereby to prevent oxidation of the contents of the can in an improved manner.

Other objects of the invention are to provide a dispenser for evaporated milk or the like bearing the above objects in mind which is of simple construction, has a minimum number of parts, is inexpensive to manufacture and efficient in use.

For other objects and for a better understanding of the invention, reference may be had to the following detailed description taken in connection with the accompanying drawing, in which:

Figure 1 is a perspective view of a preferred embodiment of the present invention;

Fig. 2 is an exploded perspective view shown partly broken away of the parts comprising the invention;

Fig. 3 is a side elevational view shown partly in section of the invention and illustrating the first step in positioning the can therewithin;

Fig. 4 is a side view shown partly in section and partly in elevation showing the same in operative use; and Fig. 5 is an exploded perspective view showing the manner in which the upper end of the can is punctured by the prongs forming a part of the invention.

Referring now more in detail to the drawing, the dispenser for evaporated milk or the like forming the subject matter of the present invention includes a container A and a removable bottom closure B therefor, substantially as illustrated.

The container A includes the circular top wall 10 integrally formed around its periphery with the hollow cylindrical side wall 11, the latter at its lower end being integrally formed with the reduced externally threaded portion 12 which is open at the bottom.

The side wall 11 at one side is integrally formed with the handle 13, while the top wall 10 at the side thereof remote from the handle 13 is integrally formed with the pouring spout 14 having a gravity actuated closure 15 adapted to close the pouring spout when not in use and to open the same when poured, as will be obvious. The top wall 10 at the side thereof remote from the pouring spout 14 is provided with a small air opening 16.

The container A and closure B are preferably formed of plastic.

An elongated rectangular steel bar 17 is secured to the undersurface of the top wall 10 in alignment with an imaginary line connecting the pouring spout 14 and air opening 16, the bar 17 being secured by means of the rivets 18. The ends of the bar 17 are integrally formed with the upwardly offset extensions 19 which are received within corresponding grooves 20 provided on the undersurface of the top wall 10, the extensions 19 being integrally formed with a downwardly and outwardly extending puncture prong 21 and 22. It will be noted that the prong 21 is of slightly V-shaped cross section (Fig. 3).

A pair of ring shaped rubber gaskets 23 are secured to the undersurface of the top wall 10 in corresponding grooves provided therefor; the prongs 21 and 22 extending downwardly through the gaskets 23.

The bottom closure 10 includes the circular bottom wall 24 integrally formed around its periphery with the upwardly extending, internally threaded skirt 25 adapted to be screwed onto the externally threaded portion 12 of the container, the upper end of the skirt 25 abutting the shoulder 26 provided intermediate the side wall 11 and the reduced externally threaded portion 12.

The height of the container A is such that when the bottom of the evaporated milk can 27 rests upon the bottom closure B just prior to screwing the same onto the container A, the top wall of the can 27 will be in contact with the points of the prongs 21 and 22 (Fig. 3). Thus, as the closure B is screwed onto the bottom of the container A, the can 27 will be forced upwardly against the prongs 21 and 22 and to be provided thereby with the puncture openings 28 and 29 (Fig. 5). Furthermore, when the closure B is screwed completely onto the container A, the top wall of the can 27 will be forced against the gaskets 23 to seal off the openings 28 and 29 against the top wall 10. Air will enter through the air opening 16 in limited quantity to the opening 29, while the opening 28 will be closed off by the gravity actuated closure 15. This will prevent excess oxygen from reaching the evaporated milk 30 and prevent the same from spoiling. Thus, only as much air as is required for pouring will be permitted to enter, as shown in Fig. 4. Due to the handle 13, the dispenser may be handled in the same manner as a pitcher, the gravity actuated closure 15 automatically opening when the dispenser is tilted. When the can 27 is empty, it is only necessary to remove the bottom closure B and to replace the same with a new can, repeating the above operations.

It should now be apparent that there has been provided a dispenser for evaporated milk or the like wherein the can and evaporated milk are received as a unit within the dispenser to eliminate the necessity of pouring the evaporated milk from the can into the dispenser and wherein as the can is positioned within the dispenser, it is automatically punctured in two places. It should also be apparent that there has been provided a dispenser of the above type which includes a handle and a pouring spout and which may be handled in the manner of a pitcher and wherein the puncture openings of the can are sealed off so as to provide them with only a limited amount of air necessary for pouring whereby to prevent spoiling of the milk.

While various changes may be made in the detail construction, it shall be understood that such changes shall be within the spirit and scope of the present invention as defined by the appended claim.

What I claim as new and desire to protect by Letters Patent of the United States is:

A dispenser comprising a substantially circular top and flat wall integrally formed around its periphery with a depending, hollow cylindrical side wall, said side wall at the lower end thereof being integrally formed with an externally threaded portion and open at the bottom, said top wall at one side being integrally formed with a pouring spout and having an opening therethrough at the other side, a screw-on closure for said container side wall lower end and having a substantially circular bottom wall and an upwardly extending internally threaded skirt adapted to be screwed onto said externally threaded portion into abutment with the lower end of said side wall, said bottom wall being adapted to support a can containing edible contents therein, puncture means disposed on the underside of the top wall comprised of a flat bar fixed to the said top wall and having an offset cutter on each end for cutting openings into the can as it is forced thereagainst with progressive screw engagement between the closure and the side wall lower end, and gaskets disposed on the underside of the top wall each surrounding the respective cutters and the base of the top wall pouring spout and the top wall opening respectively so that fluid contents of the can will not leak between the top of the punctured can and the top wall of the dispenser.

References Cited in the file of this patent

UNITED STATES PATENTS

| | | |
|---|---|---|
| 1,142,940 | Davis et al. | June 15, 1915 |
| 1,745,456 | Shuler | Feb. 4, 1930 |
| 1,952,840 | Claus et al. | Mar. 27, 1934 |
| 2,131,238 | Taylor et al. | Sept. 27, 1938 |
| 2,320,084 | Jundt | May 25, 1943 |
| 2,675,945 | Hahn | Apr. 20, 1954 |
| 2,677,481 | Stocker et al. | May 4, 1954 |